United States Patent
Linton et al.

(10) Patent No.: US 11,257,510 B2
(45) Date of Patent: Feb. 22, 2022

(54) PARTICIPANT-TUNED FILTERING USING DEEP NEURAL NETWORK DYNAMIC SPECTRAL MASKING FOR CONVERSATION ISOLATION AND SECURITY IN NOISY ENVIRONMENTS

(71) Applicant: International Business Machines Corporation, Armonk, NY (US)

(72) Inventors: Jeb R. Linton, Manassas, VA (US); Jonathan Samn, Austin, TX (US); Poojitha Bikki, Austin, TX (US); Minsik Lee, Fort Lee, NJ (US); Satya Sreenivas, Los Alamos, NM (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/700,357

(22) Filed: Dec. 2, 2019

(65) Prior Publication Data

US 2021/0166714 A1    Jun. 3, 2021

(51) Int. Cl.
*G10L 21/0208* (2013.01)
*G10L 21/0264* (2013.01)
*G10L 15/16* (2006.01)
*G10L 15/26* (2006.01)
*G10L 19/26* (2013.01)
*G10L 15/02* (2006.01)

(52) U.S. Cl.
CPC .......... *G10L 21/0264* (2013.01); *G10L 15/02* (2013.01); *G10L 15/16* (2013.01); *G10L 15/26* (2013.01); *G10L 19/26* (2013.01); *G10L 21/0208* (2013.01); *G10L 2021/02087* (2013.01)

(58) Field of Classification Search
CPC .. G10L 21/0364; G10L 15/07; G10L 21/0208
See application file for complete search history.

(56) References Cited

U.S. PATENT DOCUMENTS

| | | |
|---|---|---|
| 7,620,546 B2 | 11/2009 | Hetherington et al. |
| 8,676,572 B2 | 3/2014 | Aoki et al. |
| 9,063,695 B2 | 6/2015 | Williams et al. |

(Continued)

FOREIGN PATENT DOCUMENTS

| | | | |
|---|---|---|---|
| CN | 109076280 A | 12/2018 | |
| CN | 110070882 A | 7/2019 | |
| EP | 2380161 A1 * | 10/2011 | ........... G09G 3/2003 |

OTHER PUBLICATIONS

PCT International Search Report and Written Opinion, dated Mar. 9, 2021, regarding Application No. PCT/IB2020/061184, 9 pages.

(Continued)

*Primary Examiner* — Feng-Tzer Tzeng
(74) *Attorney, Agent, or Firm* — Yee & Associates, P.C.

(57) ABSTRACT

Isolating and amplifying a conversation between selected participants is provided. A plurality of spectral masks is received. Each spectral mask in the plurality corresponds to a respective participant in a selected group of participants included in a conversation. A composite spectral mask is generated by additive superposition of the plurality of spectral masks. The composite spectral mask is applied to sound captured by a microphone to filter out sounds that do not match the composite spectral mask and amplifying remaining sounds that match the composite spectral mask.

23 Claims, 12 Drawing Sheets

(56) References Cited

U.S. PATENT DOCUMENTS

| | | | |
|---|---|---|---|
| 9,361,903 B2 | 6/2016 | Leorin et al. | |
| 9,818,431 B2 | 11/2017 | Yu | |
| 9,870,764 B2 | 1/2018 | Marti et al. | |
| 10,014,002 B2 | 7/2018 | Koretzky et al. | |
| 10,506,323 B2 | 12/2019 | Pi et al. | |
| 2004/0208390 A1* | 10/2004 | Jiang | A61B 5/0059 382/260 |
| 2008/0192946 A1* | 8/2008 | Faller | H04M 9/082 381/66 |
| 2009/0204410 A1* | 8/2009 | Mozer | G10L 15/30 704/275 |
| 2009/0287489 A1* | 11/2009 | Savant | G10L 21/0364 704/246 |
| 2011/0188666 A1 | 8/2011 | Mason et al. | |
| 2011/0224980 A1 | 9/2011 | Nakadai et al. | |
| 2015/0063599 A1 | 3/2015 | Ring | |
| 2017/0352342 A1 | 12/2017 | Lee | |
| 2019/0045316 A1 | 2/2019 | Schneider et al. | |
| 2019/0066713 A1 | 2/2019 | Mesgarani et al. | |
| 2019/0069099 A1 | 2/2019 | Maennel | |
| 2019/0080710 A1 | 3/2019 | Zhang et al. | |
| 2019/0318757 A1 | 10/2019 | Chen et al. | |

OTHER PUBLICATIONS

Bashirpour et al., "Robust Emotional Speech Recognition based on Binaural Model and Emotional Auditory Mask in Noisy Environments," EURASIP Journal on Audio, Speech, and Music Processing, 2018, 13 pages. https://asmp-eurasipjournals.springeropen.com/articles/10.1186/s13636-018-0133-9.

Afouras et al., "The Conversation: Deep Audio-Visual Speech Enhancement," Interspeech 2018, Sep. 2-6, 2018, Hyderabad, India, 5 pages.

Yu et al., "Localization based Stereo Speech Source Separation using Probabilistic Time-Frequency Masking and Deep Neural Networks," EURASIP Journal on Audio, Speech, and Music Processing, 2016, 18 pages. https://asmp-eurasipjournals.springeropen.com/articles/10.1186/s13636-016-0085-x.

Ephrat et al., "Looking to Listen at the Cocktail Party: A Speaker-Independent Audio-Visual Model for Speech Separation,", ACM Transactions on Graphics, vol. 37, No. 4, Article 109, Aug. 2018, 11 pages.

Mell et al., "The NIST Definition of Cloud Computing," Computer Security Division, National Institute of Standards and Technology, Jan. 2011, 7 pages.

Wang, "Deep learning reinvents the hearing aid: Finally, wearers of hearing aids can pick out a voice in a crowded room," IEEE Spectrum, vol. 54, Issue 3, Mar. 2017, 13 pages.

Tung, "Google AI can pick out a single speaker in a crowd: Expect to see it in tons of products," ZDNet, accessed Nov. 12, 2019, 17 pages. https://www.zdnet.com/article/google-ai-can-pick-out-a-single-speaker-in-a-crowd-expect-to-see-it-in-tons-of-products/.

Vikhe et al., "Improving Speech Intelligibility of Sensorineural Hearing Impaired and Real Time Noise Cancellation Using Filters," International Journal of Informative & Futuristic Research, VI. 3, Issue 10, Jun. 2016, 11 pages. https://www.academia.edu/28071668/Improving_Speech_Intelligibility_of_Sensorineural_Hearing_Impaired_and_Real_Time_Noise_Cancellation_Using_Filters.

* cited by examiner

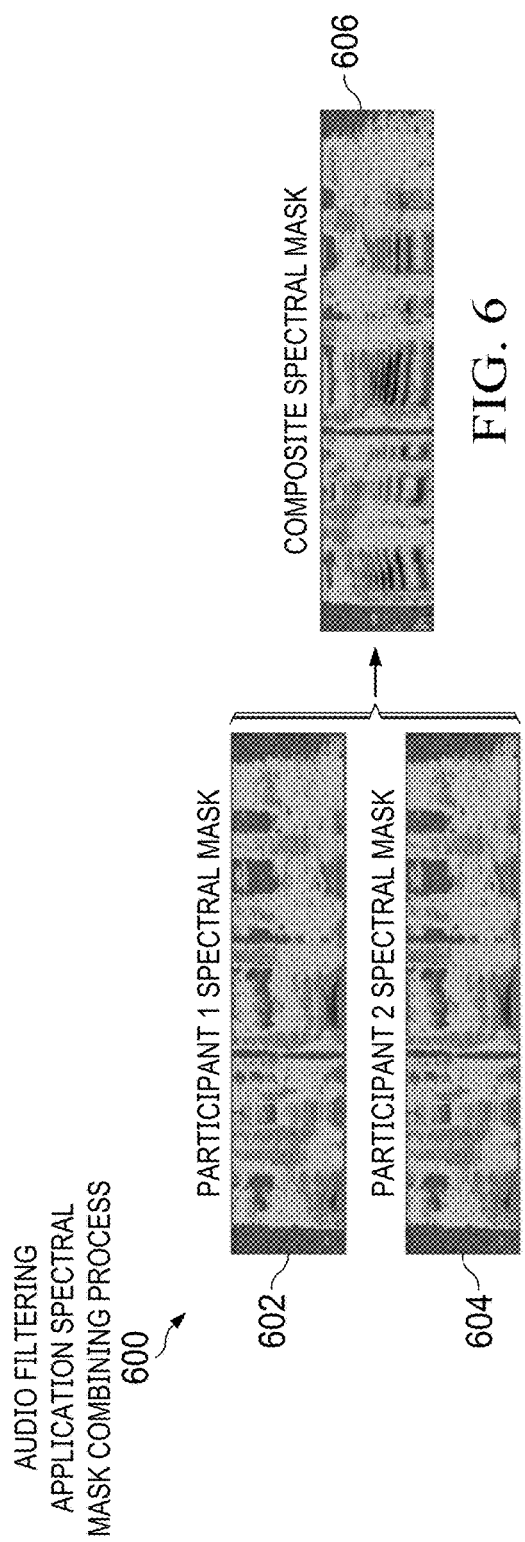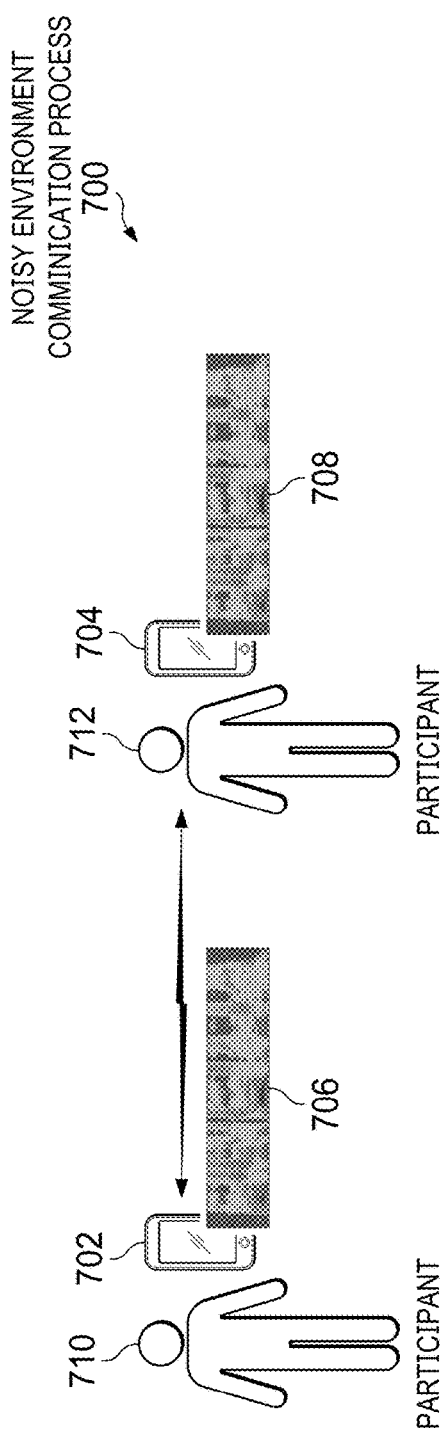

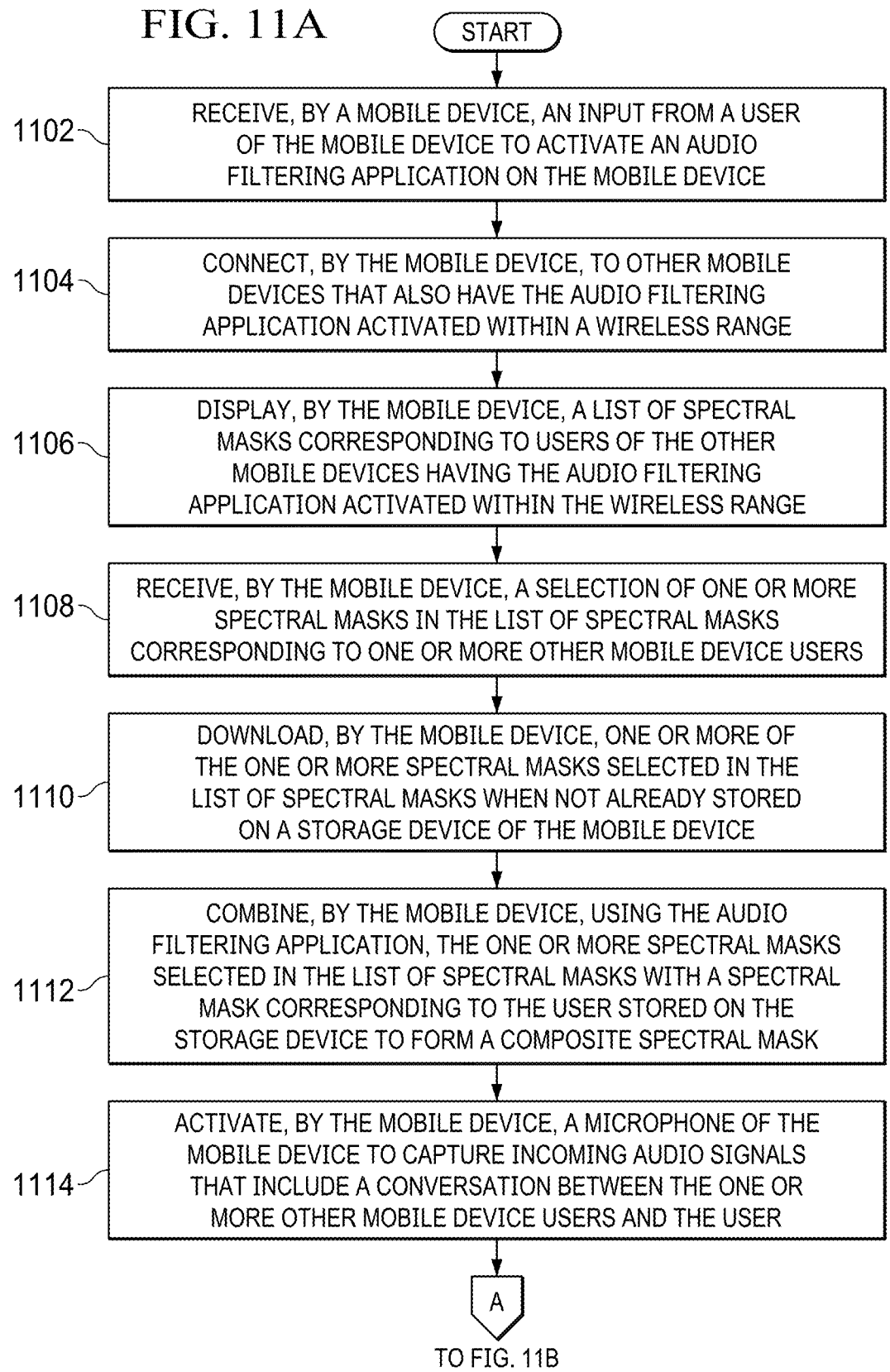

US 11,257,510 B2

PARTICIPANT-TUNED FILTERING USING DEEP NEURAL NETWORK DYNAMIC SPECTRAL MASKING FOR CONVERSATION ISOLATION AND SECURITY IN NOISY ENVIRONMENTS

BACKGROUND

1. Field

The disclosure relates generally to spectral masks and more specifically to conversation participant-tuned filtering using deep neural network dynamic spectral masking for participant conversation isolation and security in noisy environments.

2. Description of the Related Art

In telecommunications, a spectral mask is a mathematically-defined filter applied to sounds. The spectral mask is generally intended to reduce sounds that do not match the spectral mask. Attenuation of these unwanted sounds is usually done by only allowing those sounds that match the spectral mask to get through.

SUMMARY

According to one illustrative embodiment, a method for isolating and amplifying a conversation between selected participants is provided. A plurality of spectral masks is received. Each spectral mask in the plurality corresponds to a respective participant in a selected group of participants included in a conversation. A composite spectral mask is generated by additive superposition of the plurality of spectral masks. The composite spectral mask is applied to sound captured by a microphone to filter out sounds that do not match the composite spectral mask and amplifying remaining sounds that match the composite spectral mask. According to other illustrative embodiments, a mobile device and computer program product for isolating and amplifying a conversation between selected participants are provided.

The different illustrative embodiments also transmit the amplified remaining sounds that match the composite spectral mask to an audio output device corresponding to a participant of the conversation. Further, the audio output device is adjacent to an ear of the participant of the conversation.

Furthermore, the different illustrative embodiments send a voice sample of the participant of the conversation to a deep neural network server of a cloud environment for generating a spectral mask personalized to the participant and receive the spectral mask personalized to the participant from the deep neural network server. The different illustrative embodiments combine the spectral mask personalized to the participant with the plurality of spectral masks corresponding to the selected group of participants included in the conversation to form the composite spectral mask, filter incoming audio signals using the composite spectral mask to allow only the conversation between the selected group of participants and the participant to remain in an audio signal, and transmit the audio signal that includes only the conversation between the selected group of participants and the participant to the audio output device. Moreover, the different illustrative embodiments share the spectral mask personalized to the participant and the plurality of spectral masks corresponding to the selected group of participants among mobile devices corresponding to the participant and the selected group of participants so that each mobile device generates its own composite spectral mask for filtering incoming audio signals to each mobile device.

As a result, the different illustrative embodiments provide a clear and secure conversation between the selected group of participants and the participant using shared spectral masks from the mobile devices corresponding to the selected group of participants to generate the composite spectral mask for filtering out extraneous sounds so that only the voices of the participants remain in the outputted audio signal to the audio output device.

BRIEF DESCRIPTION OF THE DRAWINGS

FIG. 6 is a diagram illustrating an example of an audio filtering application spectral mask combining process in accordance with an illustrative embodiment;

FIG. 7 is a diagram illustrating an example of a noisy environment communication process in accordance with an illustrative embodiment;

FIGS. 11A-11B are a flowchart illustrating a process for filtering an incoming audio signal in accordance with an illustrative embodiment.

DETAILED DESCRIPTION

Figure 1:
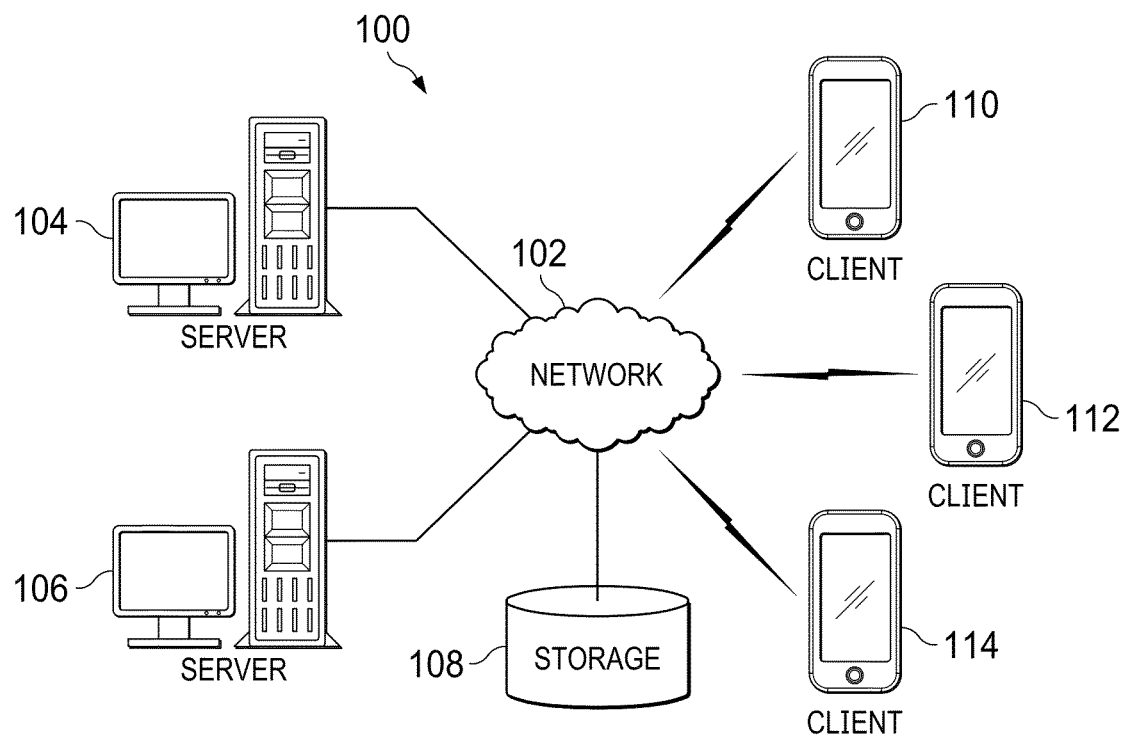
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide personalized spectral mask generation services to client device users. Also, it should be noted that server 104 and server 106 may each represent multiple computing nodes in one or more cloud environments. Alternatively, server 104 and server 106 may each represent a cluster of servers in one or more data centers.

Client 110, client 112, and client 114 also connect to network 102. Clients 110, 112, and 114 are clients of server 104 and server 106. In this example, clients 110, 112, and 114 are shown as mobile communication devices, such as, for example, cellular phones, smart phones, and the like, with wireless communication links to network 102. However, it should be noted that clients 110, 112, and 114 are examples only and may represent other types of mobile communication devices, such as, for example, laptop computers, handheld computers, smart watches, gaming devices, and the like, with wireless communication links to network 102. Users of clients 110, 112, and 114 may utilize clients 110, 112, and 114 to access the personalized spectral mask generation services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different users, voice samples for the plurality of different users, personalized spectral mask for the plurality of different users, and the like. Furthermore, storage 108 may store other types of data, such as authentication or credential data that may include user names, passwords, and biometric templates associated with client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, a telecommunications network, an internet, an intranet, a personal area network (PAN), a local area network (LAN), a wide area network (WAN), or any combination thereof. FIG. 1 is intended as an example only, and not as an architectural limitation for the different illustrative embodiments.

Figure 2:
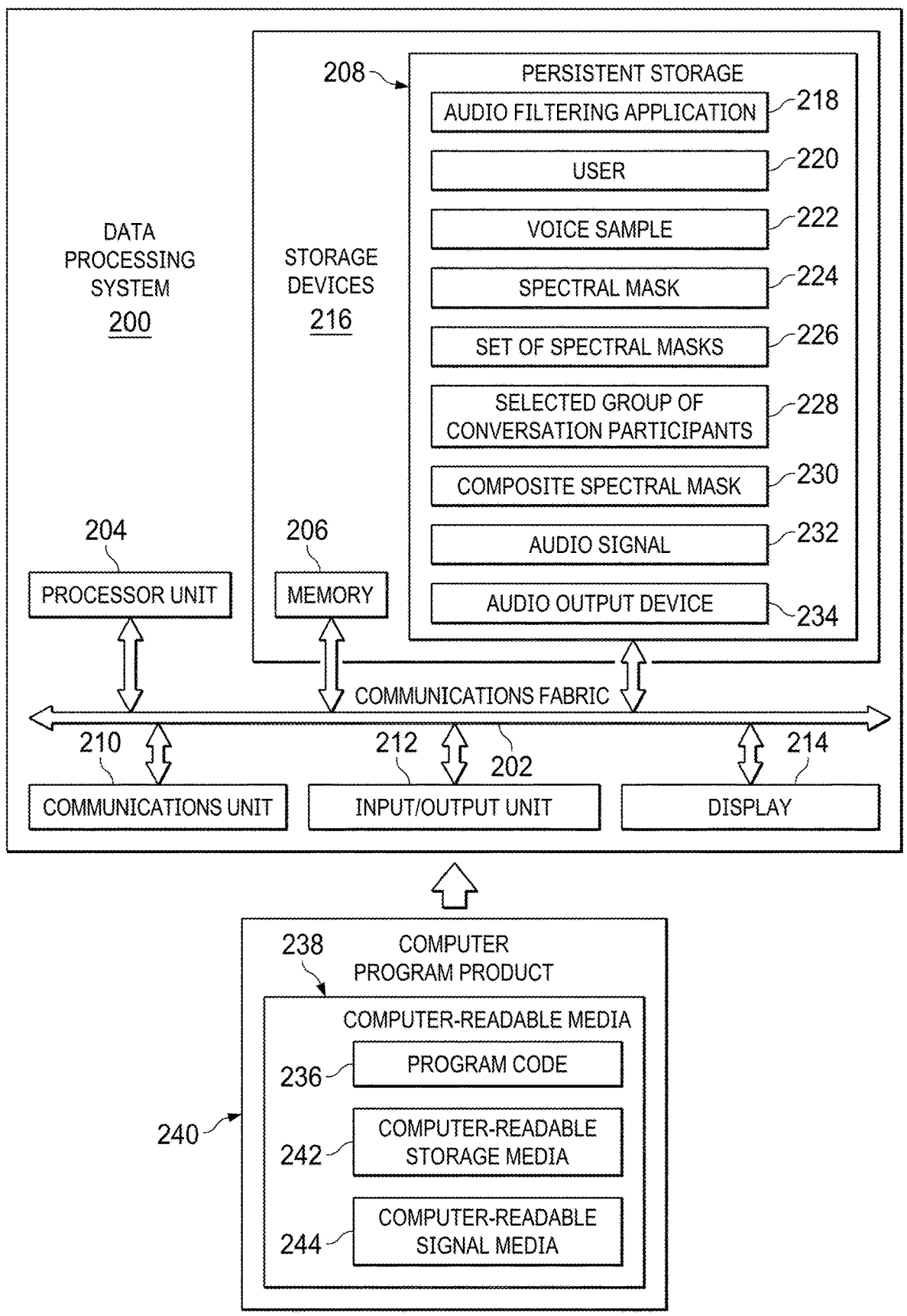
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a mobile communication device, such as client 110 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, or some combination of the above.

In this example, persistent storage 208 stores audio filtering application 218. However, it should be noted that even though audio filtering application 218 is illustrated as residing in persistent storage 208, in an alternative illustrative embodiment audio filtering application 218 may be a combination of hardware and software components separate from persistent storage 208. In another alternative illustrative embodiment, a first set of components of audio filtering application 218 may be located in data processing system 200 and a second set of components of audio filtering application 218 may be located in a second data processing system, such as, for example, server 104 in FIG. 1.

Audio filtering application 218 controls the process of combining spectral masks corresponding to participants of a conversation by additive superposition to isolate and amplify only audio signals (i.e., voices) of each participant of the conversation to increase clarity and security of the conversation. User 220 represents an identifier of the user corresponding to data processing system 200. It should be noted that user 220 also is a participant to a conversation with one or more other mobile communication device users via a network, such as, for example, network 102 in FIG. 1.

Voice sample 222 represents a biometric sample of a voice of user 220. In other words, voice sample 222 is a recording of user 220's voice. User 220 sends voice sample 222 from data processing system 200 to a spectral mask generating computer, such as, for example, server 104 in FIG. 1.

The spectral mask generating computer utilizes a deep learning neural network to generate spectral mask 224, which is personalized to user 220 based on voice sample 222. Deep learning, also known as deep structured learning or hierarchical learning, is part of machine learning based on artificial neural networks. Machine learning can be supervised, semi-supervised, or unsupervised. Deep learning architectures, such as deep neural networks, recurrent neural networks, and convolutional neural networks, have been applied to fields including speech recognition, audio recognition, natural language processing, machine translation, and the like. A deep neural network includes multiple layers between the input and output layers. The deep neural network moves through the multiple layers calculating the probability of each output. Spectral mask 224 filters incoming audio signals so that only signals matching spectral mask 224 (i.e., almost exclusively, voice signals corresponding to user 220) remain. In other words, spectral mask 224 filters out all other audio signals not matching spectral mask 224.

Set of spectral masks 226 represent a set of one or more previously shared and stored spectral masks corresponding to other users of mobile communication devices that include the audio filtering application of illustrative embodiments. Audio filtering application 218 may display set of spectral masks 226 to user 220 in display 214 just prior to, or at the start of, a conversation with other mobile communication device users for selection of some, all, or none of set of spectral masks 226. Selected group of conversation participants 228 represents one or more other mobile communication device users that user 220 has selected to participate in a conversation with user 220 via data processing system 200 and each of their respective mobile communication devices.

If one or more spectral masks of the selected conversation participants (i.e., selected group of conversation participants 228) are not listed in set of spectral masks 226, then audio filtering application 218 may request download or automatically initiate wireless download of those spectral masks not included in set of spectral masks 226 that correspond to the selected conversation participants. Afterward, audio filtering application 218 generates composite spectral mask 230, which is a combination of all spectral masks corresponding to user 220 and selected group of conversation participants 228. Alternatively, audio filtering application 218 may generates composite spectral mask 230 using the shared spectral masks corresponding to selected group of conversation participants 228 only and not user 220 based on preference of user 220.

Audio filtering application 218 generates composite spectral mask 230 using additive superposition of the spectral masks corresponding to user 220 and selected group of conversation participants 228. Audio filtering application 218 utilizes composite spectral mask 230 to isolate and amplify only audio signals of each participant of the conversation to form audio signal 232. In other words, audio signal 232 only consists of conversation participant voices and minimal other extraneous audio signals, such as background noise. Thus, audio filtering application 218, by applying composite spectral mask 230 to all incoming audio signals during the conversation, transforms the incoming audio signals to a different state or thing (i.e., audio signal 232) containing almost exclusively conversation participant voices.

Audio filtering application 218 sends audio signal 232 to audio output device 234. Audio output device 234 represents an identifier of an audio output device, such as, for example, a head set, earpieces, headphones, or the like, wire or wirelessly connected to data processing system 200. Audio output device 234 is situated in, over, or near one or both ears of user 220 for clear and secure listening of audio signal 232.

Communications unit 210, in this example, provides for communication with other computers, data processing systems, and devices via the network. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
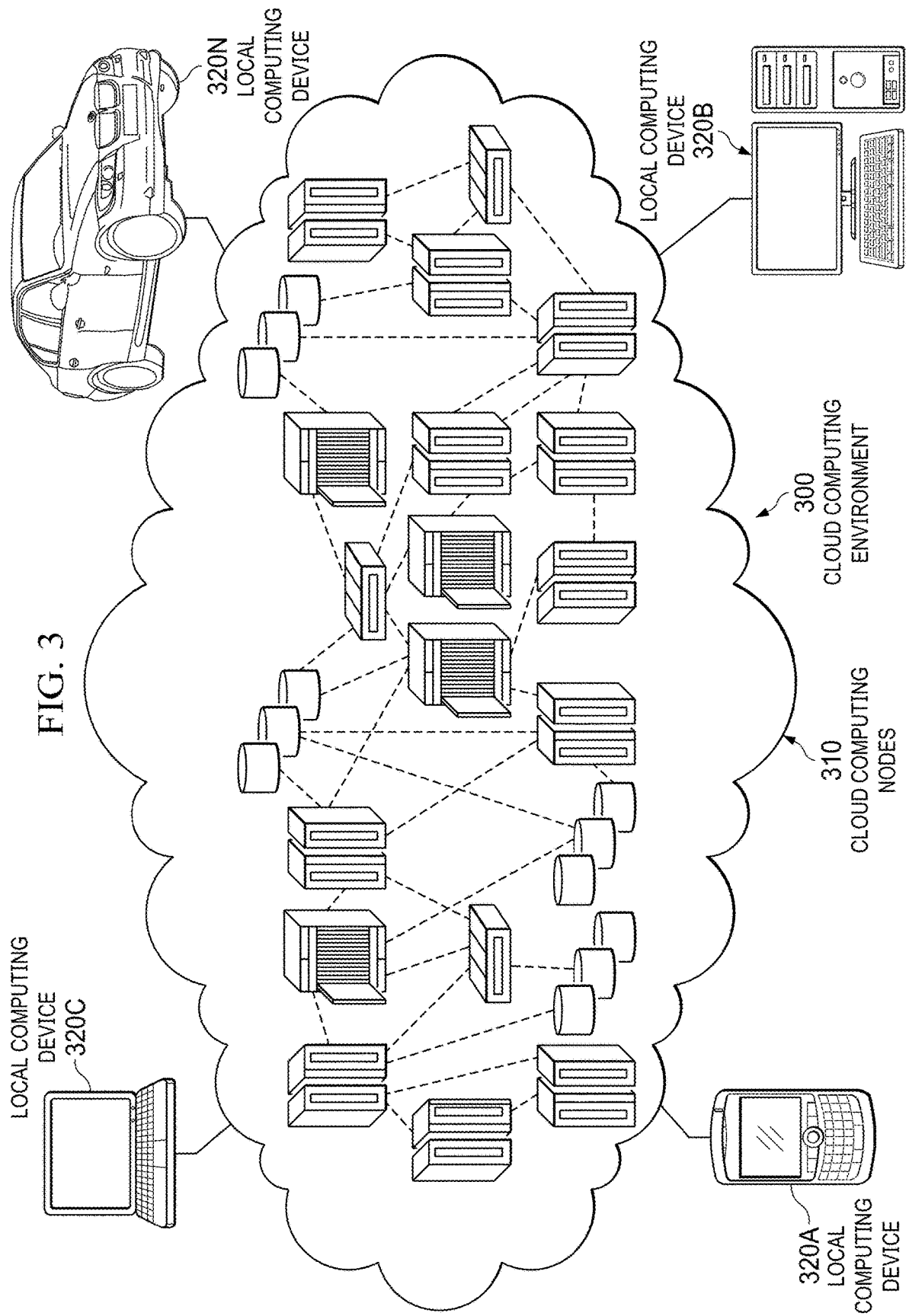
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
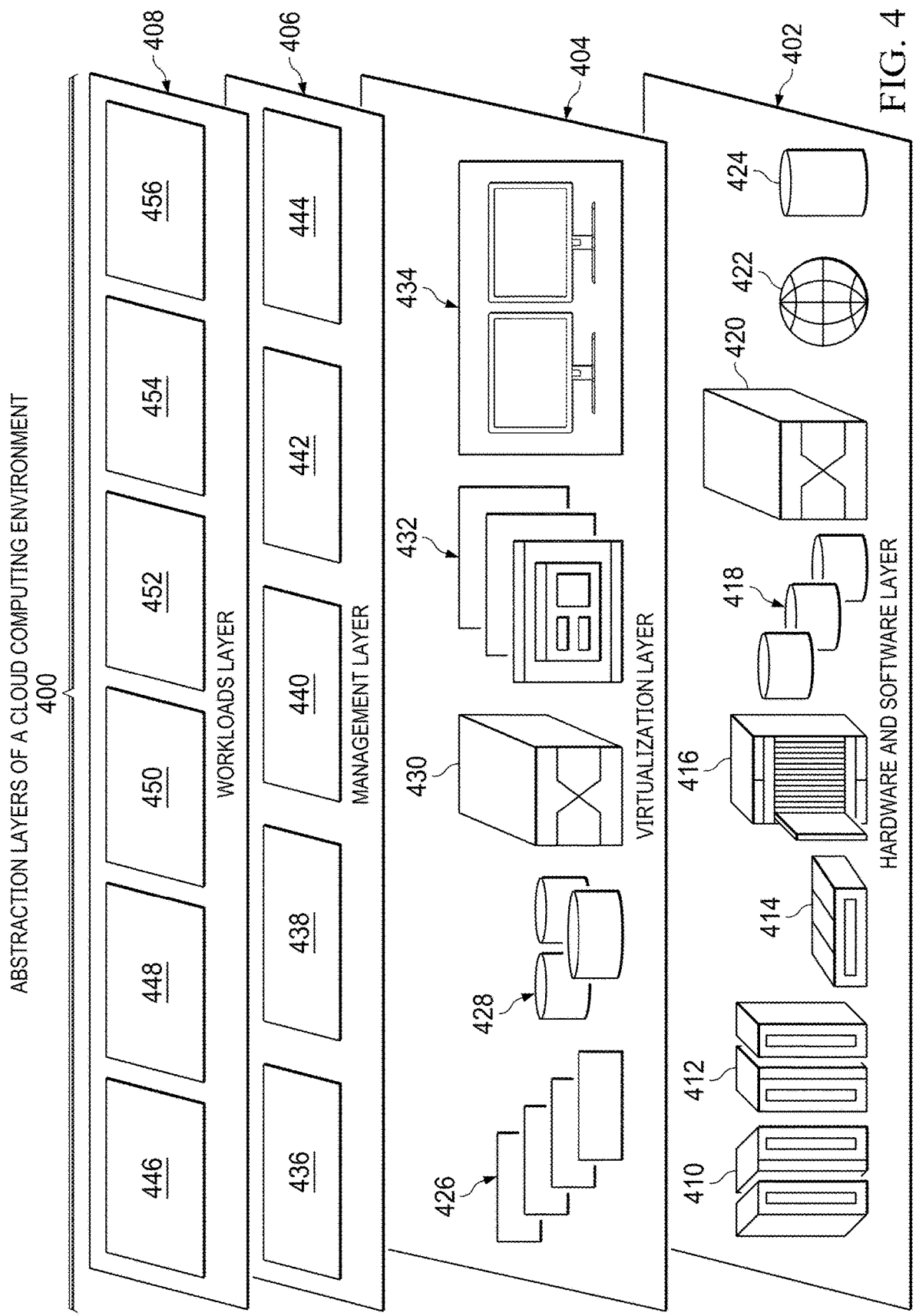
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and audio signal filtering 456.

One issue with having a conversation in a noisy environment is that it is difficult for participants of the conversation to clearly and securely hear what is being said by other participants. Some current solutions use experimental neural networks to amplify conversations in noisy environments, but none of these current solutions use already available hardware and spectral masking technology.

Recent developments in deep learning techniques make it possible to create customized individual spectral masks that embody a detailed characterization of an individual's voice. These deep learning techniques make it possible to create highly specific and effective filters to isolate an individual's voice against background noise.

Illustrative embodiments isolate and amplify a conversation between selected individuals in a noisy environment using hardware components already present in mobile phones and wired or wireless earbuds, for example. Illustrative embodiments utilize a dynamically generated compound spectral mask tuned ahead of time to individual participants of a conversation.

Illustrative embodiments utilize pretrained deep neural network dynamic spectral masking to enable clear and secure conversations between participants in a noisy environment. Illustrative embodiments provide the dynamic spectral mask deep neural network as a cloud service, which is tied to an audio filtering application residing on mobile phones. A user of a mobile phone can record a voice sample of one or more individuals, upload the voice samples to the cloud service, and have the dynamic spectral mask deep neural network tuned to each individual's voice. Optionally, voices of individuals may be recorded during conversations and isolated using existing speaker diarisation techniques or captured individually from voicemail messages. It should be noted that illustrative embodiments prefer longer voice samples and that individual spectral mask quality may depend on voice sample length and bandwidth of the codec used to capture the voice sample. Therefore, individual spectral mask quality may be improved when illustrative embodiments capture voice samples at length, with multiple voice samples of every phoneme the speaker's language includes, in a quiet environment and with a wide bandwidth encoder.

Once illustrative embodiments generate an individual's personalized dynamic spectral mask using the dynamic spectral mask deep neural network, illustrative embodiments download the spectral mask to the individual's mobile device. In addition, illustrative embodiments may delete the individual's data on the cloud environment after downloading the spectral mask to the mobile device.

Prior to a conversation or at the beginning of a conversation, individuals may share their spectral masks among mobile devices corresponding to participants of the conversation so that each individual that wishes to participate in the conversation will have all the participants' spectral masks stored on their respective mobile device. Mobile devices may share spectral masks via, for example, Bluetooth, Wi-Fi, near field communication, email, short message service, or the like.

When participants are ready to have a conversation using the audio filtering application of illustrative embodiments on their respective mobile device, the participants place, for example, headphones over or earpieces in their ears and activate the audio filtering application. Further, participants indicate to the audio filtering application who is authorized to participate in the conversation. Participants may facilitate this selection via contact lists and Bluetooth, Wi-Fi, small message server, email, or the like. Alternatively, participants may select individuals in the audio filtering application's user interface.

Next, the audio filtering application generates a composite or compound spectral mask by additive superposition of the spectral masks of each participant in the conversation. Alternatively, the audio filtering application may generate a composite spectral mask from each participant other than the user of that particular mobile device, according to that user's preference of whether the audio filtering application should amplify that user's own voice. The audio filtering application then applies this composite spectral mask to sounds coming in through a microphone of the mobile device, filters out all sounds that do not match the composite spectral mask, and amplify the remaining sounds that match the composite spectral mask through the earpieces or headphones. Thus, illustrative embodiments effectively filter out anyone else's (e.g., non-participant's) voice and nearly all other extraneous noise during the conversation.

In an alternative illustrative embodiment, a single audio filtering application may be used with multiple wireless earbuds, headset, and/or headphones so that one mobile device can serve several participants. In another alternative illustrative embodiment, the audio filtering application may include a capability to perform real-time captioning (optionally with speaker diarisation for separate speaker identification) of the conversation so that the audio filtering application can display the real-time captioning of the conversation to participants on a text output device, such as, for example, the mobile device screen or smart glasses with earpiece attached, for reading text of the conversation rather than listening to the conversation or for reading and listening at the same time. Furthermore, illustrative embodiments also include automatic gain control to normalize selected voice volume. Moreover, illustrative embodiments may optionally train an individual's spectral mask to include not only normal speech but also whispered speech.

For conversations containing sensitive content, participants may protect their exchange of information by deliberately moving into a noisy environment and using the audio filtering application of illustrative embodiments to make it extremely difficult for other individuals to eavesdrop on the conversation. Optionally, the audio filtering application may use an external speaker of the mobile device to deliberately output out-of-phase, unidentifiable phonemes or snippets of speech, which the audio filtering application actively filters out, in order to decrease a likelihood of eavesdropping or make eavesdropping more difficult. In an alternative embodiment illustrative, law enforcement may use the audio filtering application to pick out conversations between "persons of interest" in a noisy environment by means of remotely attached microphones or more specialized sound recording equipment, such as, for example, a laser microphone.

Thus, illustrative embodiments provide one or more technical solutions that overcome a technical problem with providing clear and secure conversations between mobile communication device users in a noisy environment. As a result, these one or more technical solutions provide a technical effect and practical application in the field of mobile device communication.

Figure 5:
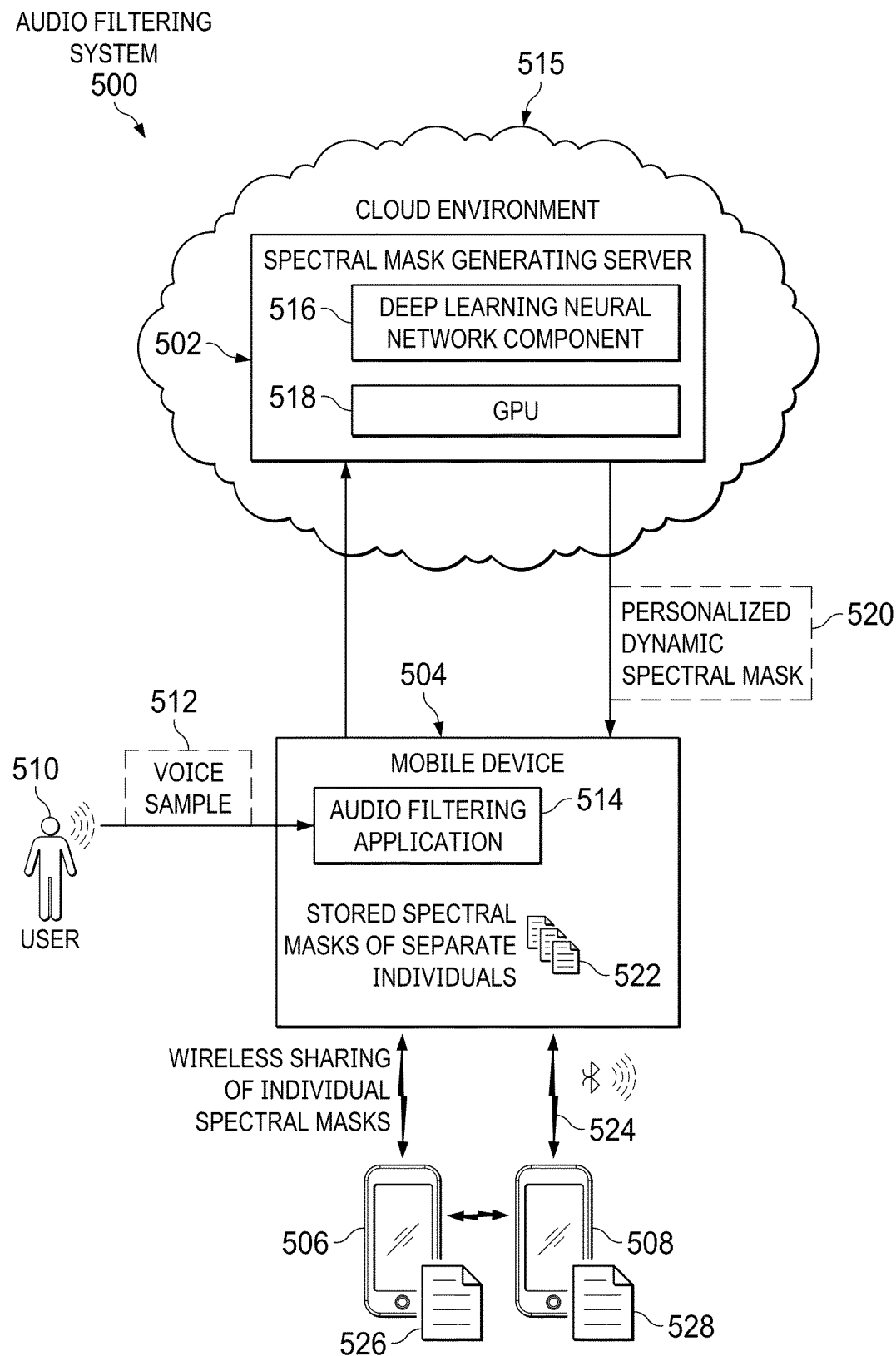
FIG. 5 is a diagram illustrating an example of an audio filtering system in accordance with an illustrative embodiment.

With reference now to FIG. 5, a diagram illustrating an example of an audio filtering system is depicted in accordance with an illustrative embodiment. Audio filtering system 500 may be implemented in a network of data processing systems, such as network data processing system 100 in FIG. 1, or a cloud computing environment, such as cloud computing environment 300 in FIG. 3. Audio filtering system 500 is a system of hardware and software components for conversation participant-tuned filtering using deep neural network dynamic spectral masking for participant conversation isolation, amplification, and security in noisy environments.

In this example, audio filtering system 500 includes spectral mask generating server 502, mobile device 504, mobile device 506, and mobile device 508. However, it should be noted that audio filtering system 500 may include any number of servers, mobile devices, and other devices not shown. Spectral mask generating server 502, mobile device 504, mobile device 506, and mobile device 508 may be, for example, server 104, client 110, client 112, and client 114 in FIG. 1, respectively.

User 510 represents a user of mobile device 504. Mobile device 504 may be, for example, a smart phone or other mobile communication device. User 510 inputs voice sample 512 into mobile device 504. Mobile device 504 records voice sample 512 and utilizes audio filtering application 514, such as audio filtering application 218 in FIG. 2, to send voice sample 512 to spectral mask generating server 502, which resides in cloud environment 515 in this example. Spectral mask generating server 502 utilizes deep learning neural network component 516 and graphics processing unit 518 to generate personalized dynamic spectral mask 520, which corresponds to user 510, based on voice sample 512. Personalized dynamic spectral mask 520 is a predictive time-series model that predicts next likely frequency signature of user 510's voice moment by moment [probably about once per millisecond] as sounds are processed. In other words, personalized dynamic spectral mask 520 predicts word sound sequences of user 510 during a conversation. Spectral mask generating server 502 sends personalized dynamic spectral mask 520 to mobile device 504.

Stored spectral masks of separate individuals 522 represents personal dynamic spectral mask 520, which corresponds to user 510, and other spectral masks corresponding to other mobile communication device users previously shared with mobile device 504. In this example, mobile device 506 and mobile device 508 correspond to other users that user 510 selected to be participants in a conversation. As a result, at 524, mobile device 506 and mobile device 508 wireless share via, for example, Bluetooth technology, their respective spectral masks, spectral mask 526 and spectral mask 528, respectively, with mobile device 504. After receiving spectral mask 526 and spectral mask 528, audio filtering application 514 combines personal dynamic spectral mask 520 with spectral mask 526 and spectral mask 528 to form a composite spectral mask for filtering the microphone feeds of mobile device 504, mobile device 506, and mobile device 508 to only allow the voices of user 510 and the users of mobile device 506 and mobile device 508 to be heard.

With reference now to FIG. 6, a diagram illustrating an example of an audio filtering application spectral mask combining process is depicted in accordance with an illustrative embodiment. Audio filtering application spectral mask combining process 600 may be implemented in a mobile device, such as client 110 in FIG. 1, data processing system 200 in FIG. 2, smart phone 320A in FIG. 3, or mobile device 504 in FIG. 5. In this example, audio filtering application spectral mask combining process 600 combines participant 1 spectral mask 602 and participant 2 spectral mask 604. However, it should be noted that audio filtering application spectral mask combining process 600 may combine any number of spectral masks corresponding to any number of selected participants to a conversation.

At the start of the conversation between participant 1 and participant 2, an audio filtering application, such as, for example, audio filtering application 218 in FIG. 2 or audio filtering application 514 in FIG. 5, combines participant 1 spectral mask 602 and participant 2 spectral mask 604 into composite spectral mask 606. Composite spectral mask 606 uses a logical ORing in the frequency domain creating a filter that permits only voices of participant 1 and participant 2 and no other extraneous sounds in the outputted audio signal.

With reference now to FIG. 7, a diagram illustrating an example of a noisy environment communication process is depicted in accordance with an illustrative embodiment. Noisy environment communication process 700 includes mobile device 702 and mobile device 704. Audio filtering applications of illustrative embodiments running on mobile device 702 and mobile device 704 apply composite spectral mask 706 and composite spectral mask 708, respectively, to incoming audio signals of a conversation between participant 710 and participant 712 so that participant 710 and participant 712 can hear each other and themselves clearly and securely without other sounds from the noisy environment included.

Figure 8:
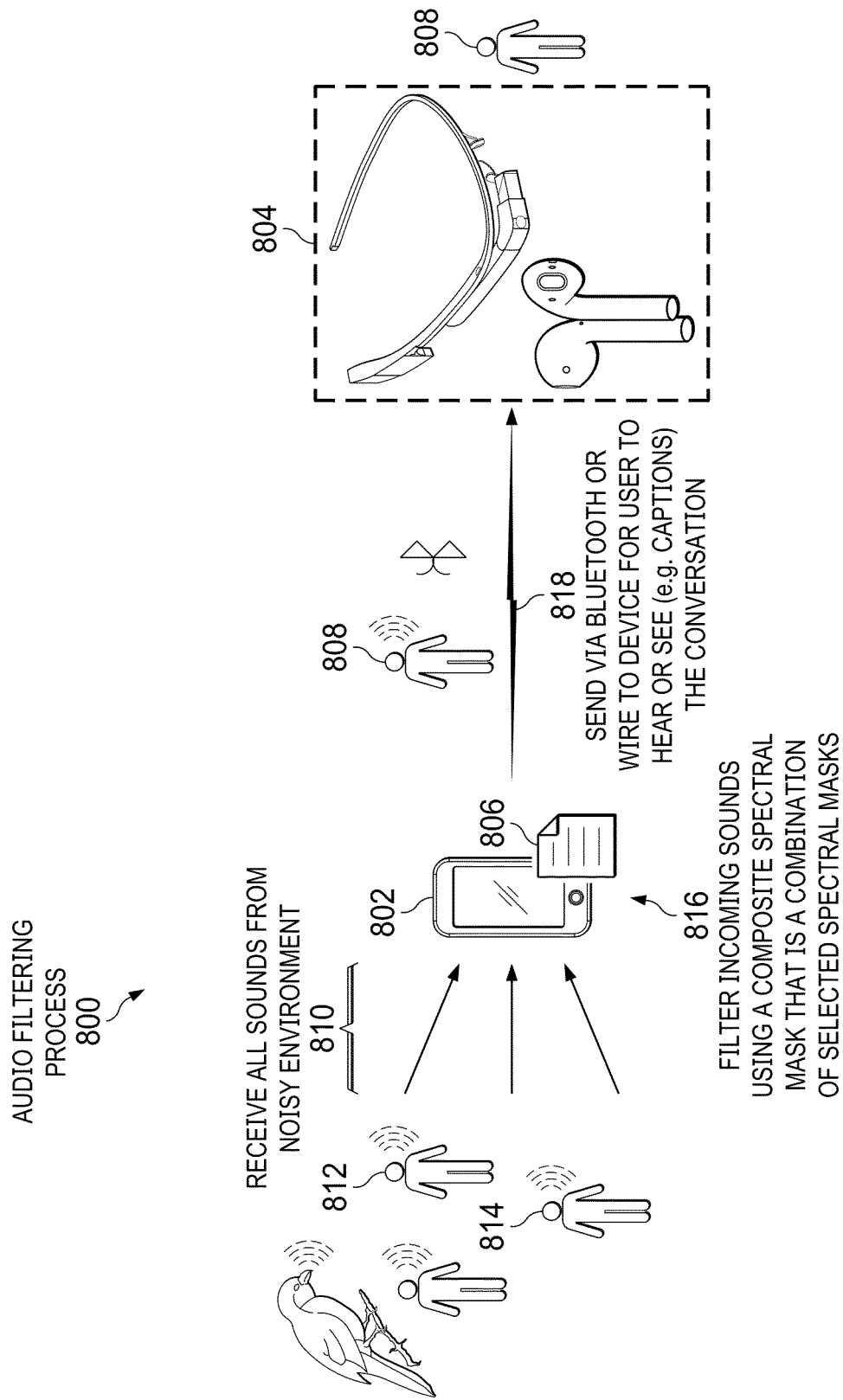
FIG. 8 is a diagram illustrating an example of an audio filtering process in accordance with an illustrative embodiment.

With reference now to FIG. 8, a diagram illustrating an example of an audio filtering process is depicted in accordance with an illustrative embodiment. Audio filtering process 800 includes mobile device 802 and audio output device 804, which is wire or wirelessly coupled to mobile device 802. Audio output device 804 may be, for example, earbuds, smart glasses with earpiece, or the like. It should be noted that alternative illustrative embodiments may convert the audio signal of a conversation to a textual format and output the text on the smart glasses or mobile device screen instead of or in addition to the audio.

Mobile device 802 stores spectral mask 806, which corresponds to conversation participant 808 who is a user of mobile device 802. Also, it should be noted that audio output device 804 is worn by conversation participant 808 adjacent to or in one or both ears of conversation participant 808.

At 810, mobile device 802 receives all sounds from the noisy environment including microphone feeds from mobile devices corresponding to conversation participant 812 and conversation participant 814. At 816, mobile device 802 filters the incoming sounds using a composite spectral mask, which is a combination of spectral masks selected by conversation participant 808, that includes spectral mask 806 and spectral masks corresponding to conversation participants 812 and 814. At 818, mobile device 802 sends via Bluetooth or wire to audio output device 804 the filtered audio signal for conversation participant 808 to clearly and securely hear and/or see the conversation.

Figure 9:
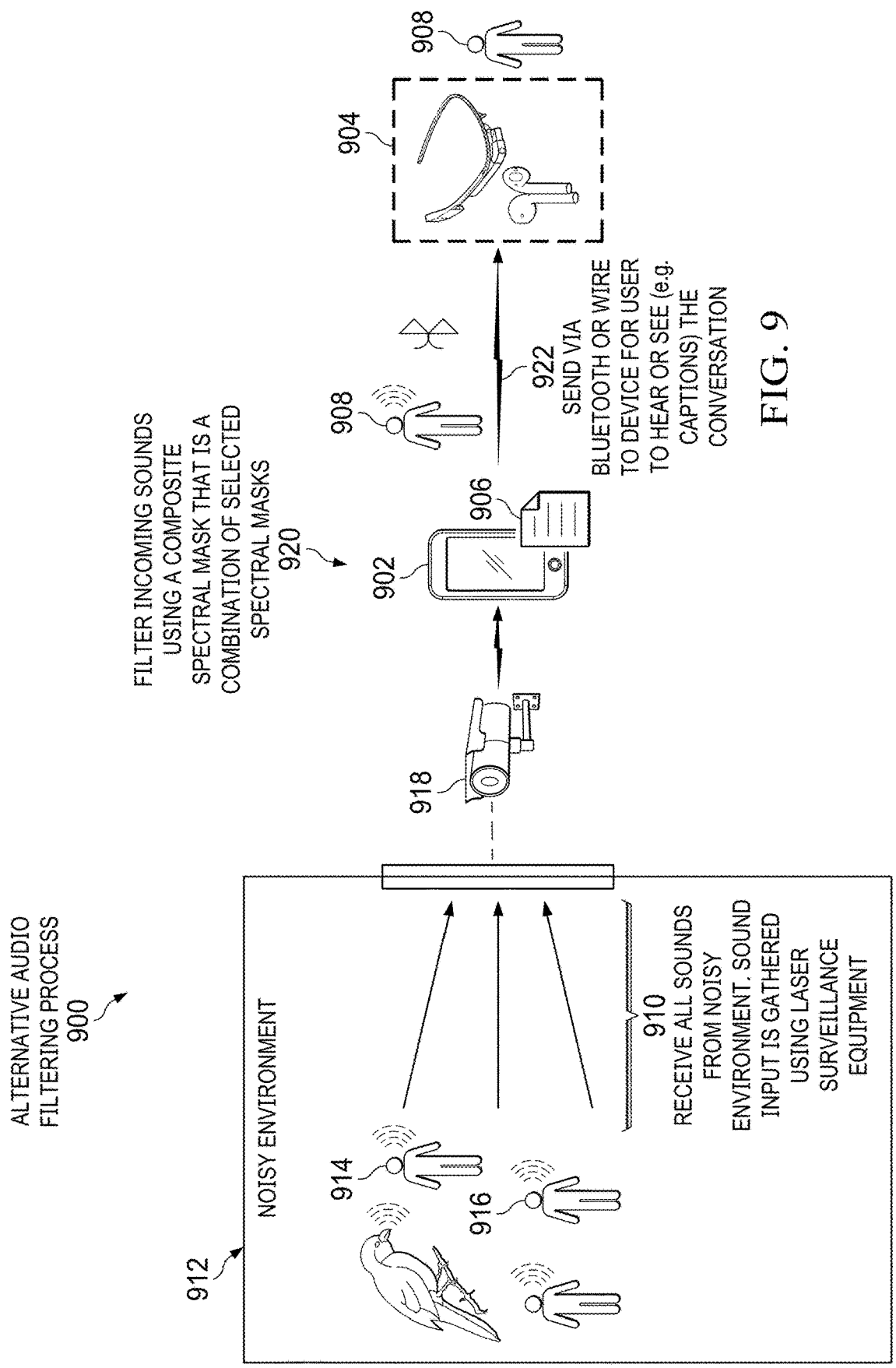
FIG. 9 is a diagram illustrating an example of an alternative audio filtering process in accordance with an illustrative embodiment.

With reference now to FIG. 9, a diagram illustrating an example of an alternative audio filtering process is depicted in accordance with an illustrative embodiment. Alternative audio filtering process 900 includes mobile device 902 and audio output device 904, which is wire or wirelessly coupled to mobile device 902.

Mobile device 902 stores spectral mask 906, which corresponds to conversation participant 908 who is a user of mobile device 902. Also, audio output device 904 is worn by conversation participant 908 adjacent to or in one or both ears of conversation participant 908.

At 910, mobile device 902 receives all sounds from noisy environment 912, which includes voices of conversation participant 914 and conversation participant 916, via laser surveillance equipment 918. Laser surveillance equipment 918 may be, for example, a laser microphone. At 920, mobile device 802 filters the incoming sounds using a composite spectral mask, which is a combination of spectral masks selected by conversation participant 908. The composite spectral mask includes spectral mask 806 and spectral masks corresponding to conversation participants 914 and 916. At 922, mobile device 902 sends via Bluetooth or wire the filtered audio signal to audio output device 904 for conversation participant 908 to clearly and securely hear and/or see the conversation.

Figure 10:
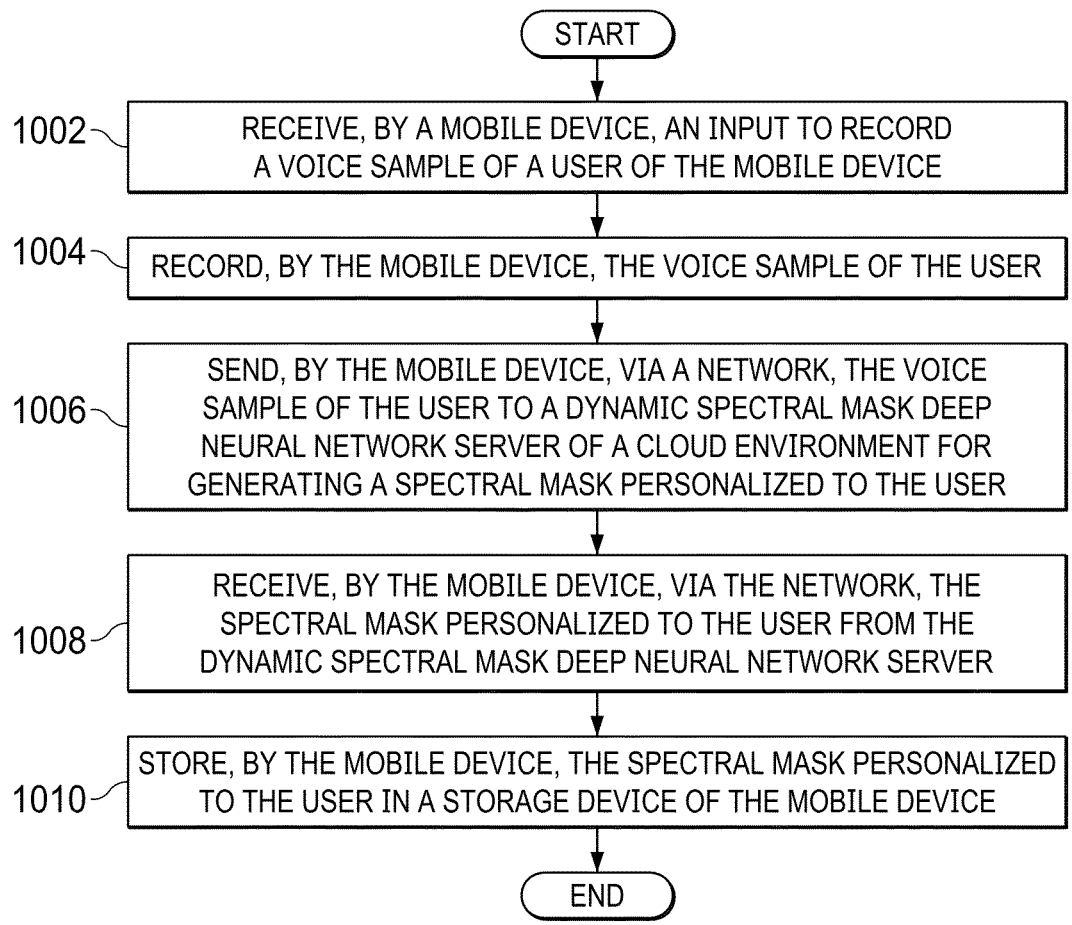
FIG. 10 is a flowchart illustrating a process for receiving a personalized spectral mask in accordance with an illustrative embodiment.

With reference now to FIG. 10, a flowchart illustrating a process for receiving a personalized spectral mask is shown in accordance with an illustrative embodiment. The process shown in FIG. 10 may be implemented in a mobile device, such as, for example, client 110 in FIG. 1, data processing system 200 in FIG. 2, smart phone 320A in FIG. 3, or mobile device 504 in FIG. 5.

The process begins when the mobile device receives an input to record a voice sample of a user of the mobile device (step 1002). The mobile device records the voice sample of the user (step 1004). The mobile device sends, via a network, the voice sample of the user to a dynamic spectral mask deep neural network server of a cloud environment for generating a spectral mask personalized to the user (step 1006).

Subsequently, the mobile device receives, via the network, the spectral mask personalized to the user from the dynamic spectral mask deep neural network server (step 1008). The mobile device stores the spectral mask personalized to the user in a storage device of the mobile device (step 1010). Thereafter, the process terminates.

Figure 11B:
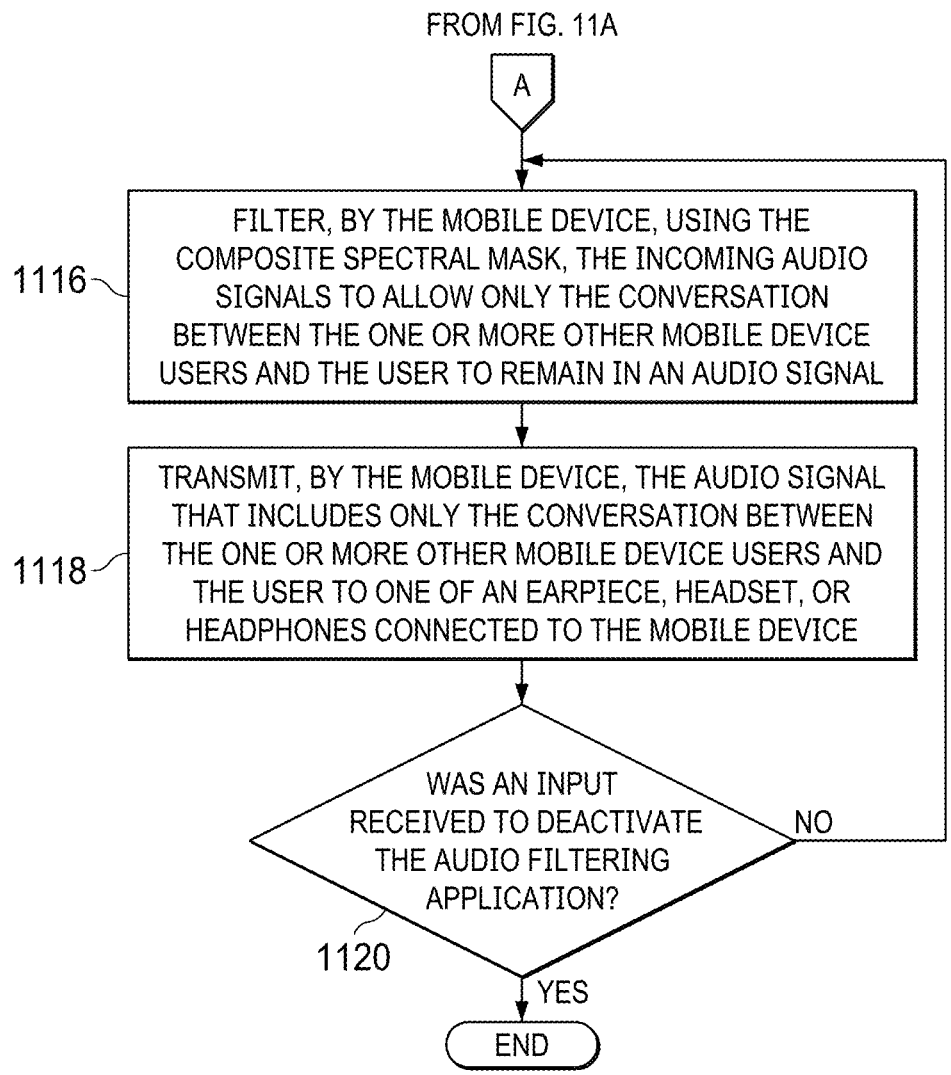

With reference now to FIGS. 11A-11B, a flowchart illustrating a process for filtering an incoming audio signal is shown in accordance with an illustrative embodiment. The process shown in FIGS. 11A-11B may be implemented in a mobile device, such as, for example, client 110 in FIG. 1, data processing system 200 in FIG. 2, smart phone 320A in FIG. 3, or mobile device 504 in FIG. 5.

The process begins when the mobile device receives an input from a user of the mobile device to activate an audio filtering application on the mobile device (step 1102). In response to activating the audio filtering application on the mobile device in step 1102, the mobile device connects to other mobile devices that also have the audio filtering application activated within a wireless range, such as, for example, within Bluetooth range (step 1104). Afterward, the mobile device displays a list of spectral masks corresponding to users of the other mobile devices having the audio filtering application activated within the wireless range (step 1106).

The mobile device receives from the user of the mobile device a selection of one or more spectral masks in the list of spectral masks corresponding to one or more other mobile device users to be included in a conversation (step 1108). The mobile device downloads one or more of the one or more spectral masks selected in the list of spectral masks when the one or more of the one or more spectral masks are not already stored on a storage device of the mobile device (step 1110). The mobile device, using the audio filtering application, combines the one or more spectral masks selected in the list of spectral masks with a spectral mask corresponding to the user stored on the storage device to form a composite spectral mask (step 1112).

The mobile device activates a microphone of the mobile device to capture incoming audio signals that include the conversation between the one or more other mobile device users and the user (step 1114). The mobile device, using the composite spectral mask, filters the incoming audio signals to allow only the conversation between the one or more other mobile device users and the user to remain in an audio signal (step 1116). The mobile device transmits the audio signal that includes only the conversation between the one or more other mobile device users and the user to one of an earpiece, headset, or headphones connected to the mobile device (step 1118).

The mobile device makes a determination as to whether an input was received to deactivate the audio filtering application (step 1120). If the mobile device determines that an input was not received to deactivate the audio filtering application, no output of step 1120, then the process returns to step 1116 where the mobile device continues to filter the incoming audio signals using the composite spectral mask. If the mobile device determines that an input was received to deactivate the audio filtering application, yes output of step 1120, then the process terminates thereafter.

Figure 12:
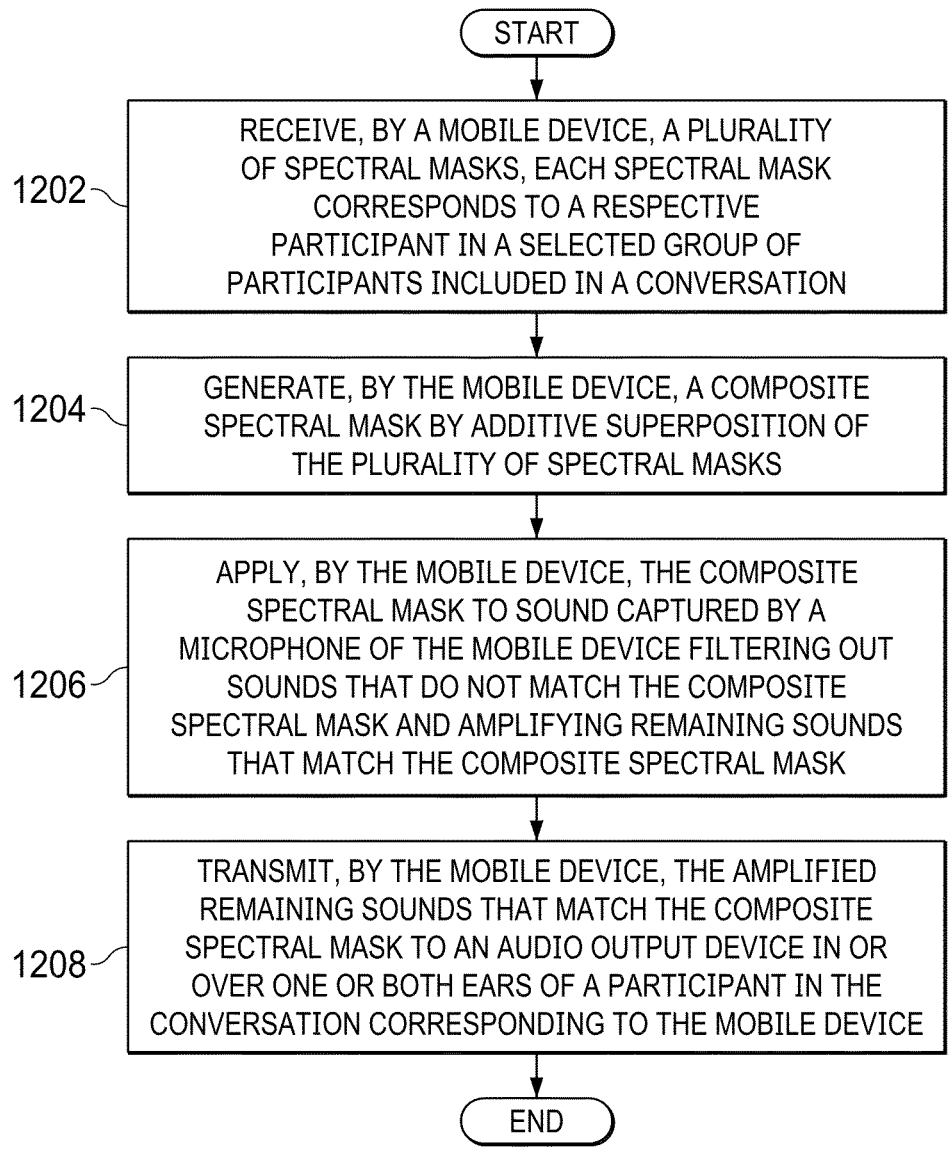
FIG. 12 is a flowchart illustrating a process for isolating and amplifying a conversation between selected participants in accordance with an illustrative embodiment.

With reference now to FIG. 12, a flowchart illustrating a process for isolating and amplifying a conversation between selected participants is shown in accordance with an illustrative embodiment. The process shown in FIG. 12 may be implemented in a mobile device, such as, for example, client 110 in FIG. 1, data processing system 200 in FIG. 2, smart phone 320A in FIG. 3, or mobile device 504 in FIG. 5.

The process begins when the mobile device receives a plurality of spectral masks (step 1202). Each spectral mask in the plurality of spectral masks corresponds to a respective participant in a selected group of participants included in a conversation. The mobile device generates a composite spectral mask by additive superposition of the plurality of spectral masks (step 1204).

The mobile device applies the composite spectral mask to sound captured by a microphone of the mobile device filtering out sounds that do not match the composite spectral mask and amplifies remaining sounds that match the composite spectral mask (step 1206). The mobile device transmits the amplified remaining sounds that match the composite spectral mask to an audio output device in or over one or both ears of a participant in the conversation corresponding to the mobile device (step 1208). Thereafter, the process terminates.

Thus, illustrative embodiments of the present invention provide a computer-implemented method, computer system, and computer program product for conversation participant-tuned filtering using deep neural network dynamic spectral masking for participant conversation isolation, amplification, and security in noisy environments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for isolating a conversation between selected participants, the method comprising:
   receiving, by a mobile device, a plurality of spectral masks, each spectral mask in the plurality corresponds to a respective participant in a selected group of participants included in a conversation, wherein the mobile device wirelessly receives the plurality of spectral masks from mobile devices corresponding to the selected group of participants included in the conversation, and wherein a spectral mask is a mathematically-defined filter applied to sounds;
   generating, by the mobile device, a composite spectral mask by additive superposition of the plurality of spectral masks personalized to each respective participant included in the conversation as a personalized spectral mask that is a predictive time-series model predicting next frequency signature of a respective participant's voice as sounds are processed; and
   applying, by the mobile device, the composite spectral mask to sound captured by a microphone to filter out sounds that do not match the composite spectral mask using a logical OR operation in a frequency domain creating a filter that permits only voices of the selected group of participants included in the conversation.

2. The method of claim 1 further comprising:
   transmitting, by the mobile device, remaining sounds that match the composite spectral mask to an audio output device corresponding to a participant of the conversation.

3. The method of claim 2 further comprising:
   performing, by the mobile device, real-time captioning of the conversation between the selected participants; and
   displaying, by the mobile device, the real-time captioning of the conversation to the participant of the conversation on one of a mobile device screen or smart glasses with the audio output device attached for reading text of the conversation as well as listening to the conversation.

4. The method of claim 2, wherein the audio output device corresponding to the participant of the conversation and for which the remaining sounds are transmitted thereto is adjacent to an ear of the participant of the conversation.

5. The method of claim 2 further comprising:
   sending, by the mobile device, a voice sample of the participant of the conversation to a deep neural network server of a cloud environment for generating a spectral mask personalized to the participant; and
   receiving, by the mobile device, the spectral mask personalized to the participant from the deep neural network server.

6. The method of claim 5 further comprising:
   combining, by the mobile device, the spectral mask personalized to the participant with the plurality of spectral masks corresponding to the selected group of participants included in the conversation to form the composite spectral mask;

filtering, by the mobile device, using the composite spectral mask, incoming audio signals to allow only the conversation between the selected group of participants and the participant to remain in an audio signal; and transmitting, by the mobile device, the audio signal that includes only the conversation between the selected group of participants and the participant to the audio output device.

7. The method of claim 6 further comprising:

sharing, by the mobile device, the spectral mask personalized to the participant and the plurality of spectral masks corresponding to the selected group of participants among mobile devices corresponding to the participant and the selected group of participants so that each mobile device generates its own composite spectral mask for filtering incoming audio signals to each mobile device.

8. The method of claim 5, wherein the spectral mask personalized to the participant of the conversation is excluded from the composite spectral mask based on preference of the participant.

9. The method of claim 1, wherein the selected group of participants indicates who is authorized to participate in the conversation.

10. A mobile device for isolating a conversation between selected participants, the mobile device comprising:

a bus system;

a storage device connected to the bus system, wherein the storage device stores program instructions; and a processor connected to the bus system, wherein the processor executes the program instructions to:

receive a plurality of spectral masks, each spectral mask in the plurality corresponds to a respective participant in a selected group of participants included in a conversation, wherein the mobile device wirelessly receives the plurality of spectral masks from mobile devices corresponding to the selected group of participants included in the conversation, and wherein a spectral mask is a mathematically-defined filter applied to sounds;

generate a composite spectral mask by additive superposition of the plurality of spectral masks personalized to each respective participant included in the conversation as a personalized spectral mask that is a predictive time-series model predicting next frequency signature of a respective participant's voice as sounds are processed; and apply the composite spectral mask to sound captured by a microphone to filter out sounds that do not match the composite spectral mask using a logical OR operation in a frequency domain creating a filter that permits only voices of the selected group of participants included in the conversation.

11. The mobile device of claim 10, wherein the processor further executes the program instructions to:

transmit remaining sounds that match the composite spectral mask to an audio output device corresponding to a participant of the conversation.

12. The mobile device of claim 11, wherein the processor further executes the program instructions to:

perform real-time captioning of the conversation between the selected participants; and display the real-time captioning of the conversation to the participant of the conversation on one of a mobile device screen or smart glasses with the audio output device attached for reading text of the conversation as well as listening to the conversation.

13. The mobile device of claim 11, wherein the audio output device corresponding to the participant of the conversation and for which the remaining sounds are transmitted thereto is adjacent to an ear of the participant of the conversation.

14. The mobile device of claim 11, wherein the processor further executes the program instructions to:

send a voice sample of the participant of the conversation to a deep neural network server of a cloud environment for generating a spectral mask personalized to the participant; and receive the spectral mask personalized to the participant from the deep neural network server.

15. The mobile device of claim 14, wherein the processor further executes the program instructions to:

combine the spectral mask personalized to the participant with the plurality of spectral masks corresponding to the selected group of participants included in the conversation to form the composite spectral mask;

filter, using the composite spectral mask, incoming audio signals to allow only the conversation between the selected group of participants and the participant to remain in an audio signal; and transmit the audio signal that includes only the conversation between the selected group of participants and the participant to the audio output device.

16. The mobile device of claim 15, wherein the processor further executes the program instructions to:

share the spectral mask personalized to the participant and the plurality of spectral masks corresponding to the selected group of participants among mobile devices corresponding to the participant and the selected group of participants so that each mobile device generates its own composite spectral mask for filtering incoming audio signals to each mobile device.

17. A computer program product for isolating a conversation between selected participants, the computer program product comprising a computer readable storage medium having program instructions embodied therewith, the program instructions executable by a mobile device to cause the mobile device to perform a method comprising:

receiving a plurality of spectral masks, each spectral mask in the plurality corresponds to a respective participant in a selected group of participants included in a conversation, wherein the mobile device wirelessly receives the plurality of spectral masks from mobile devices corresponding to the selected group of participants included in the conversation, and wherein a spectral mask is a mathematically-defined filter applied to sounds;

generating a composite spectral mask by additive superposition of the plurality of spectral masks personalized to each respective participant included in the conversation as a personalized spectral mask that is a predictive time-series model predicting next frequency signature of a respective participant's voice as sounds are processed; and applying the composite spectral mask to sound captured by a microphone to filter out sounds that do not match the composite spectral mask using a logical OR operation in a frequency domain creating a filter that permits only voices of the selected group of participants included in the conversation.

18. The computer program product of claim 17 further comprising:
transmitting remaining sounds that match the composite spectral mask to an audio output device corresponding to a participant of the conversation.

19. The computer program product of claim 18 further comprising:
performing real-time captioning of the conversation between the selected participants; and
displaying the real-time captioning of the conversation to the participant of the conversation on one of a mobile device screen or smart glasses with the audio output device attached for reading text of the conversation as well as listening to the conversation.

20. The computer program product of claim 18, wherein the audio output device corresponding to the participant of the conversation and for which the amplified remaining sounds are transmitted thereto is adjacent to an ear of the participant of the conversation.

21. The computer program product of claim 18 further comprising:
sending a voice sample of the participant of the conversation to a deep neural network server of a cloud environment for generating a spectral mask personalized to the participant; and
receiving the spectral mask personalized to the participant from the deep neural network server.

22. The computer program product of claim 21 further comprising:
combining the spectral mask personalized to the participant with the plurality of spectral masks corresponding to the selected group of participants included in the conversation to form the composite spectral mask;
filtering, using the composite spectral mask, incoming audio signals to allow only the conversation between the selected group of participants and the participant to remain in an audio signal; and
transmitting the audio signal that includes only the conversation between the selected group of participates and the participant to the audio output device.

23. The computer program product of claim 22 further comprising:
sharing the spectral mask personalized to the participant and the plurality of spectral masks corresponding to the selected group of participants among mobile devices corresponding to the participant and the selected group of participants so that each mobile device generates its own composite spectral mask for filtering incoming audio signals to each mobile device.

\* \* \* \* \*